(No Model.)
E. G. HOLLOWAY.
MARKING DEVICE.
No. 583,879.  Patented June 1, 1897.
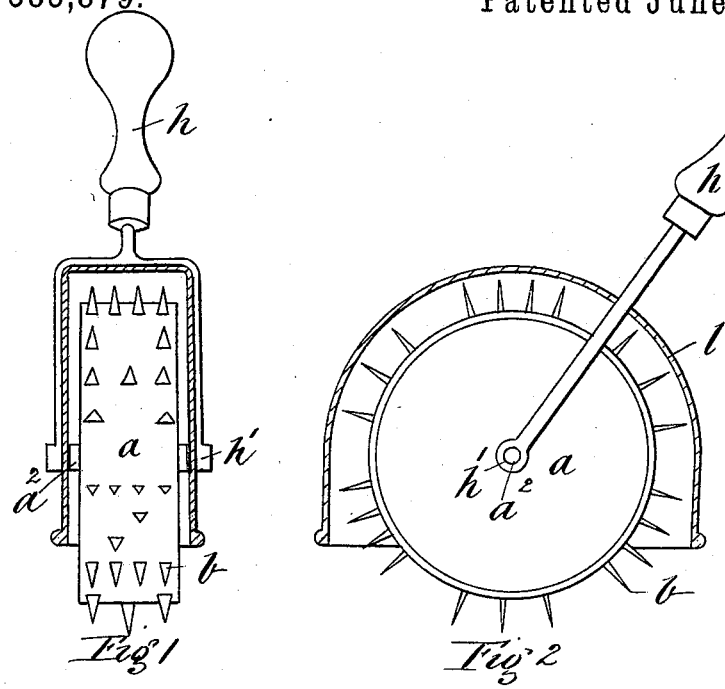
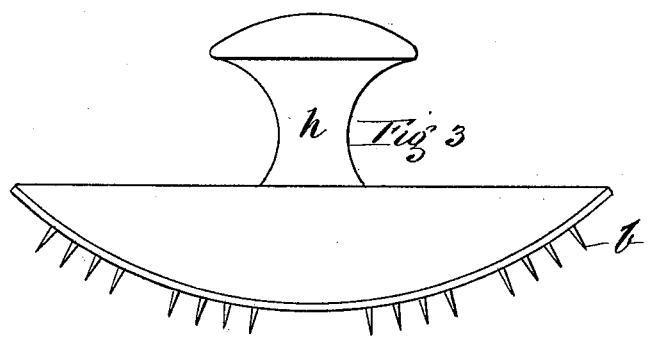
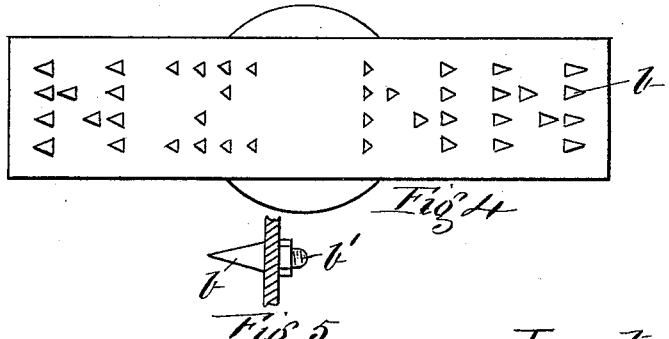
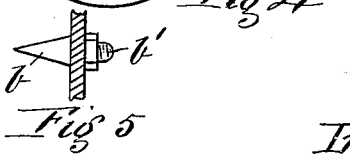
Witnesses
Maurice J. Sioussa
Geo. M. Copenhaver
Inventor
Edwin George Holloway
by Wm H Babcock
Attorney

UNITED STATES PATENT OFFICE.

EDWIN GEORGE HOLLOWAY, OF WELLINGTON, NEW ZEALAND, ASSIGNOR TO JOSEPH SMYTHE, OF PENDLETON, NEW ZEALAND.

MARKING DEVICE.

SPECIFICATION forming part of Letters Patent No. 583,879, dated June 1, 1897.

Application filed October 31, 1895. Serial No. 567,485. (No model.) Patented in New Zealand April 20, 1894, No. 7,681.

*To all whom it may concern:*

Be it known that I, EDWIN GEORGE HOLLOWAY, a subject of the Queen of Great Britain, residing at Wellington, in the Colony of New Zealand, have invented an Improved Tool or Instrument for Marking the Carcasses of Animals, (which has been patented in New Zealand by Letters Patent No. 7,681, dated April 20, 1894,) of which the following is a specification.

The object of this invention is to provide means for marking a carcass with any desired characters by cutting slits in the inner skin thereof while still warm, such slits opening and becoming distinctly visible as the said skin cools, and being arranged in predetermined order and size to present conspicuously the desired characters after such cooling, the meat itself not being defaced or injured by the above operation. To this end I use cutting-blades or edge-tools, which may be pressed into the inner skin of the meat or turned or otherwise drawn against the same to make the incisions required. These cuts must be such as will be drawn apart after the manner of lips by the contraction of the inner skin while cooling and drying—that is to say, the nature of each incision must be that of a slit or slash or a congeries or combination of slits or slashes. A mere puncture, which leaves no contiguous lips, will not be enlarged by such contraction of the inner skin, but rather closed in part or drawn out of shape.

In the accompanying drawings, Figure 1 represents a front elevation, and Fig. 2 represents a side view, of a device embodying a preferred form of my invention, the cover or case being shown in both these views in section. Figs. 3 and 4 represent another form of my invention in side elevation and in plan view, respectively. Fig. 5 is a detail view, partly in section, of a lancet-shaped cutter and the means for attaching the same to the body of the device.

Each of the cutters or knives $b$ has a stem $b'$, which passes through the peripheral wall of the body $a$ of the device and is fastened within the same by a nut or other suitable means. In the example shown, Figs. 1 and 4, these knives are arranged in the form of the letters N Z, but they may be arranged to form any other characters desired.

The body of the device may be cylindrical, as shown in Figs. 1 and 2, or may have the form of a segment of a circle in cross-section, as shown in Figs. 3 and 4. I do not, however, confine myself to these particular forms, they being illustrated merely for convenience and greater clearness. The cylinder or roller $a$ (shown in Figs. 1 and 2) is provided with gudgeons $a^2$, which receive bearings $h'$, formed on the lower ends of the bifurcated shank of an operating-handle $h$, whereby the said roller or cylinder and its knives are caused to travel over the surface to be marked, making the necessary incisions in the inner skin. The said roller is protected except at the bottom, by a case or shell $l$, which rests on the said gudgeons.

In Figs. 3 and 4 the handle is fixed to the body of the device, which is rocked in contact with the carcass, the operation being very much the same as that of a common form of blotting-pad. This movement also will cut the necessary slits or incisions into the inner skin of the carcass, and on its cooling the characters thus formed will be very plainly visible. A tool or implement used for this purpose may be applied by steady pressure or by a sudden blow, as well as by the rocking or rotary motion above described. The marks made are permanent and indelible, have no deleterious effect on the meat, and cannot be altered or transferred with impunity.

Having thus described my invention, what I claim as new, and desire to secure by Letters Patent, is—

An implement for marking carcasses consisting of a body provided with blades or cutting edges adapted to make slits or incisions in the inner skin of such form or character that they will open as the skin contracts, the said cutters being arranged to form predetermined characters in the said skin, which characters become conspicuous by such expansion substantially as set forth.

EDWIN GEORGE HOLLOWAY.

Witnesses:
 HENRY HUGHES,
 W. O. HUGHES.